Patented Aug. 10, 1954

2,686,194

UNITED STATES PATENT OFFICE 2,686,194

ORGANOSILICON COMPOUNDS

Herbert J. Passino, Englewood, and Louis C. Rubin, West Caldwell, N. J., assignors to The M. W. Kellogg Company, Jersey City, N. J., a corporation of Delaware No Drawing. Application May 31, 1951, Serial No. 229,278

6 Claims. (Cl. 260—448.2)

This invention relates to novel halogenated organosilicon compounds. More particularly the invention relates to fluoro-alkyl silicon halide compounds and the process for preparing them. This application is a continuation-in-part of our prior application Serial No. 786,150, filed November 14, 1947, now abandoned.

In the various industrial applications of resinous materials, there has long been the need for resins or plastics possessing characteristics that will broadly meet present day requirements, and at the same time lend themselves for adaptability to the requirements of future uses. In this respect, it is highly desirable that such characteristics include an ability of the resin or plastic to withstand relatively high temperatures without thermal decomposition or deterioration in flexibility, improved dielectric strength in instances where such material is used as an electrical insulating medium without a corresponding increase in the number of layers of such material to obtain the desired dielectric strength, and an ability of the material to exhibit low changes in viscosity under wide temperature variations.

Heretofore, it has been well known in the production of silicon resins that hydrocarbon halides can be made to react with silicon and other elements, with or without the addition of a catalyst to promote the reaction. For example, hydrocarbon halides react in solution with magnesium to form the well-known Grignard reagents, or with zinc to form alkyl zinc halides. It is also well-known that various hydrocarbon-substituted silicon halides can be prepared either by application of the Grignard reagent or by the action of hydrocarbon halides on silicon or silicon-catalyst mixtures. Alkyl silicon halides thus produced may be subjected to condensation by hydrolysis, with or without subsequent polymerization of the resulting product, to produce the corresponding silicon resins, which, depending upon the conditions of hydrolysis, vary characteristically over an extremely high boiling range. The resinous materials thus produced have been found to possess varying stability, so that an ability of the material to withstand relatively high temperatures without thermal decomposition or to exhibit low changes in viscosity under wide temperature variations, is not obtained. In addition, it has been found that because of the instability of the aforementioned resinous materials, improved dielectric strength and non-deterioration in flexibility can only be obtained where these materials do not vary characteristically over wide boiling ranges.

It is, therefore, an object of this invention to provide resinous materials comprising halogenated organosilicon compounds of greater thermal and chemical stability, which can withstand relatively high temperatures without thermal decomposition, exhibit relatively low changes in viscosity, possess improved dielectric strength and relatively less deterioration in stability under wide temperature variations, than any of the resins or plastic heretofore known.

Another object of the invention is to provide for new compositions of matter comprising fluoro-alkyl halides of silicon.

Still another object of the invention is to provide for a process for the preparation of new compositions of matter comprising fluoro-alkyl halides of silicon.

Other objects and advantages inherent in the invention will become apparent from the following more detailed disclosure.

The present invention relates to a new class of halogenated organosilicon compounds comprising perfluoro-alkyl silicon halides having the general formula $[C_nF_{(2n+1)}]_y SiX_z$ where $X$ is a halogen other than fluorine; $n$, $y$ and $z$ are whole numbers, and the sum of $y$ and $z$ is equal to 4. Examples of such compounds are:

Perfluoro-alkyl silicon chlorides, such as $CF_3SiCl_3$, trifluoromethyl silicon tri-chloride
$(CF_3)_2SiCl_2$, di-trifluoromethyl silicon di-chloride
$(CF_3)_3SiCl$, tri-trifluoromethyl silicon chloride
$C_2F_5SiCl_3$, pentafluoroethyl sicilon tri-chloride
$(C_2F_5)_2SiCl_2$, di-pentafluoroethyl silicon di-chloride
$(C_2F_5)_3SiCl$, tri-pentafluoroethyl silicon chloride
$C_3F_7SiCl_3$, heptafluoropropyl silicon tri-chloride
$(C_3F_7)_2SiCl_2$, di-heptafluoropropyl silicon di-chloride
$(C_3F_7)_3SiCl$, tri-heptafluoropropyl silicon chloride
etc.;

Perfluoro-alkyl silicon bromides, such as $CF_3SiBr_3$, trifluoromethyl silicon tri-bromide
$(CF_3)_2SiBr_2$, di-trifluoromethyl silicon di-bromide
$(CF_3)_3SiBr$, tri-trifluoromethyl silicon bromide
$C_2F_5SiBr_3$, pentafluoroethyl silicon tri-bromide ($C_2F_5$)$_2$SiBr$_2$, di-pentafluoroethyl silicon dibromide
($C_2F_5$)$_3$SiBr, tri-pentafluoroethyl silicon bromide
$C_3F_7$SiBr$_3$, heptafluoropropyl silicon tri-bromide
($C_3F_7$)$_2$SiBr$_2$, di-heptafluoropropyl silicon dibromide
($C_3F_7$)$_3$SiBr, tri-heptafluoropropyl silicon bromide
etc.; or Perfluoro-alkyl silicon iodides, such as $CF_3SiI_3$, trifluoromethyl silicon tri-iodide
($CF_3$)$_2$SiI$_2$, di-trifluoromethyl silicon di-iodide
($CF_3$)$_3$SiI, tri-trifluoromethyl silicon iodide
$C_2F_5SiI_3$, pentafluoroethyl silicon tri-iodide
($C_2F_5$)$_2$SiI$_2$, di-pentafluoroethyl silicon di-iodide
($C_2F_5$)$_3$SiI, tri-pentafluoroethyl silicon iodide
$C_3F_7SiI_3$, heptafluoropropyl silicon tri-iodide
($C_3F_7$)$_2$SiI$_2$, di-heptafluoropropyl silicon di-iodide
($C_3F_7$)$_3$SiI, tri-heptafluoropropyl silicon chloride
etc.

Polymerization of the above-mentioned types of perfluoro-alkyl silicon halides produces a class of resins or plastics possessing greater thermal and chemical stability than have heretofore been obtained. It is found that such resinous or plastic materials exhibit greater chemical stability, resistance to oxidation, improved dielectric strength, less deterioration in flexibility and low viscosity under wide variations in temperature, than have previously been known, resulting in new synthetic compositions which by reason of the aforementioned characteristics, are highly valuable in meeting present day industrial requirements, and which at the same time may be easily adapted to future needs. It is known to those skilled in the art, that the fluoro-alkanes possess greater chemical stability than the corresponding alkanes. For example, trifluoromethane having a molecular weight of 70.02, a melting point of −163° C. and a boiling point of −82.2° C., is a far more stable compound than methane, which has a molecular weight of 16.04, a melting point of −184° C. and a boiling point of −161.5° C. Hence, this characteristic of increased stability in the fluoro-alkanes is transmitted to resins or plastics derived from the condensation of the aforementioned perfluoro-alkyl silicon halides, these fluoro-alkyl silicon halides comprising new compositions of matter.

According to this invention, perfluoro-alkyl silicon halide compounds, having the aforementioned general formula and as illustrated by the aforementioned examples of such compounds, are prepared, broadly, by contacting a perfluoro-alkyl halide having the general formula: $C_nF_{(2n+1)}X$, in which X is a halogen atom other than fluorine, that is, either chlorine, bromine or iodine, and $n$ is a whole number, with silicon at a temperature between about 200° C. and about 800° C., and preferably at a temperature between about 300° C. and about 500° C. in a reaction zone, with or without the presence of a catalyst, under conditions such that the corresponding perfluoro-alkyl halide, having the aforementioned general formula $[C_nF_{(2n+1)}]_ySiX_z$ is produced as a new composition of matter. The reaction between the perfluoro-alkyl halide and silicon is carried out at atmospheric pressure, although super-atmospheric pressures are preferred.

The aforementioned individual addition compounds of silicon and the perfluoro-alkyl halides are not necessarily obtained in quantitative yield. Instead, a mixture of the corresponding mono, di and tri halides of the perfluoro-alkyl silicons is normally produced. The concentration of the perfluoro-alkyl silicon halide compounds in such mixtures can be controlled to some extent by varying the conditions of temperature, pressure and contact time. The perfluoro-alkyl silicon halide thus produced is next withdrawn from the reaction zone and cooled to a temperature preferably not higher than about 10° C. The cooled perfluoro-alkyl silicon halide may next be subjected to hydrolysis to produce the corresponding polymers of silicon resins, as a product of the process, as more fully hereinafter described.

The perfluoro-alkyl halides selected for the above-mentioned reaction with silicon are not confined to any particular group of such compounds, provided they fall within the general formula, indicated above, $C_nF_{(2n+1)}X$. Hence, we may preferably employ, although not necessarily limited thereto, such compounds as:

Perfluoro-alkyl chlorides, such as $CF_3Cl$, trifluoromethyl chloride
$C_2F_5Cl$, pentafluoroethyl chloride
$C_3F_7Cl$, heptafluoropropyl chloride
etc.;

Perfluoro-alkyl bromides, such as $CF_3Br$, trifluoromethyl bromide
$C_2F_5Br$, pentafluoroethyl bromide
$C_3F_7Br$, heptafluoropropyl bromide
etc.; or Perfluoro-alkyl iodides, such as $CF_3I$, trifluoromethyl iodide
$C_2F_5I$, pentafluoroethyl iodide
$C_3F_7I$, heptafluoropropyl iodide
etc.

As stated above, the particular perfluoro-alkyl halide selected is contacted with silicon, with or without the presence of a catalyst. Where it is desired to use a catalyst to promote the reaction, we preferably employ a catalyst comprising elementary metals such as copper, aluminum, iron, chromium, nickel, zinc or vanadium or mixtures thereof. In addition, where a catalyst is used, we have found it generally preferable to introduce the catalyst into the reaction zone in admixture with the silicon. It should be noted, however, that silicon and catalyst may also be introduced separately into the reaction zone, if so desired. Where the metal to be employed as the catalyst is present in the form of an oxide, such as CuO, NiO, $V_2O_5$, or $Fe_3O_4$, or mixtures of metal oxides, it is desirable, although not necessary to first reduce these compounds to the elementary metal state. For this purpose, these compounds are reduced in hydrogen at a temperature between about 900° C. and about 1200° C., for a period from about 1 to 3 hours. Such high temperatures in carrying out the aforementioned reduction, are of particular value in aiding the admixture of the metal catalyst with the silicon. Where it is desired to introduce the catalyst into the reaction zone in admixture with the silicon, as indicated above, the reduction of the aforementioned metal compounds in admixture with silicon, not only brings these metallic compounds to the elementary metal state, but also tends to activate the entire silicon-catalyst mass. We have found that optimum results in the reaction between the perfluoro-alkyl halides and silicon, in the presence of a catalyst, to produce the corresponding perfluoro-alkyl silicon halides, are obtained when the weight ratio of the total quantity of elementary metal catalyst to silicon varies between about 1:9 and about 1:99. Expressed in another manner, where a catalyst is employed in promoting the aforementioned reaction, the quantity of elementary metal catalyst present may vary between about 1 per cent and about 10 per cent by weight of the catalyst-silicon mixture, and the quantity of silicon present in the mixture may vary between about 90 per cent and about 99 per cent by weight. It is preferred, however, to employ a weight ratio of elementary metal catalyst to silicon between about 1:33 and about 1:99; or expressed in another manner, the quantity of elementary metal catalyst may, preferably, vary between about 1 per cent and 3 per cent by weight of the catalyst-silicon mixture, and the quantity of silicon present in the mixture may, preferably, vary between about 97 per cent and about 99 per cent by weight.

As previously indicated, after reaction between the perfluoro-alkyl halides and silicon, with or without the presence of a metallic catalyst, has taken place in the reaction zone under the conditions described above, the reaction product comprising the corresponding perfluoro-alkyl silicon halide is withdrawn and cooled to a temperature preferably not higher than about 10° C. Hydrolysis of the cooled perfluoro-alkyl silicon halide thus produced, to obtain the corresponding polymers of silicon resins, may be carried out by slowly mixing an excess of water or other hydrolyzing agent with the perfluoro-alkyl silicon halide, obtained as described above. Residual water and hydrochloric acid formed during the reaction can be readily separated by any of the conventional methods known to those skilled in the art; or, if so desired, any excess water remaining, following the above-mentioned hydrolysis step, may be evaporated under vacuum. By varying the hydrolysis conditions, different polymers of the aforementioned perfluoro-alkyl silicon halides may be obtained.

The following specific examples will serve to illustrate, but are not intended in any way to limit the process of the present invention in the preparation of perfluoro-alkyl silicon halides, comprising new compositions of matter, which may be subsequently subjected to condensation and polymerization to produce a new class of resins or plastics possessing the characteristics hereinbefore described.

*Example I*

A stream of gaseous trifluoromethyl chloride, $CF_3Cl$, is passed into a suitable reaction vessel where it is contacted with a porous mass consisting of a varying mixture of 90 per cent to 99 per cent silicon and a 1 per cent to 10 per cent fine copper powder, this mass preferably having been reduced in hydrogen at a temperature varying between about 900° C. and about 1200° C., for a period of approximately 3 hours. A reaction temperature varying between about 200° C. and about 800° C., is maintained for the most part between about 400° C. and about 500° C. within the reaction vessel, for a time sufficient to produce a reaction mass comprising trifluoromethyl silicon chlorides, viz: trifluoromethyl silicon tri-chloride, di-trifluoromethyl silicon di-chloride and tri-trifluoromethyl silicon chloride. At this point it is found that these chlorides can be separated into individual components, where so desired, by distillation or other suitable means. The aforementioned mass thus obtained and comprising trifluoromethyl silicon chlorides, is then cooled to a temperature of approximately 10° C. and subjected to hydrolysis with water, under conditions effective to produce a series of polymers of silicon resins having fluorine incorporated into the alkyl radicals thereof.

*Example II*

A stream of gaseous pentafluoroethyl chloride, $C_2F_5Cl$, is passed over a porous silicon-catalyst mass (as used in Example I), in a suitable reaction vessel. A reaction temperature varying between about 350° C. and about 400° C. is maintained within the reaction vessel. Contact of the gas-silicon mass is maintained for a sufficient time effective to produce a reaction product comprising chiefly, pentafluoroethyl silicon chlorides, viz: pentafluoroethyl silicon tri-chloride, di-pentafluoroethyl silicon di-chloride and tri-pentafluoroethyl silicon chloride. This reaction product is next subjected to hydrolysis with water under conditions effective to produce the corresponding fluoro-alkyl silicon resins.

*Example III*

A stream of gaseous heptafluoropropyl chloride, $C_3F_7Cl$, is passed over a porous silicon-catalyst mass (as used in Example I), in a suitable reaction vessel. A reaction temperature varying between about 350° C. and about 450° C. is maintained within the reaction vessel. Contact of the gas-silicon mass is maintained for a sufficient time effective to produce a reaction product comprising chiefly, heptafluoropropyl silicon chlorides, viz: heptafluoropropyl silicon tri-chloride, di-heptafluoropropyl silicon di-chloride and tri-heptafluoropropyl silicon chloride. This reaction product is next subjected to hydrolysis with water under conditions effective to produce the corresponding fluoro-alkyl silicon resins.

*Example IV*

A stream of gaseous trifluoromethyl bromide, $CF_3Br$, is passed over a porous silicon-catalyst mass (as used in Example I) in a suitable reaction vessel. A reaction temperature varying between about 300° C. and about 400° C. is maintained within the reaction zone. Contact of the gas-silicon mass is maintained for a sufficient time effective to produce a reaction product comprising chiefly, trifluoromethyl silicon bromides, viz: trifluoromethyl silicon tri-bromide, di-trifluoromethyl silicon di-bromide and tri-trifluoromethyl silicon bromide. This reaction product is next subjected to hydrolysis with water under conditions effective to produce the corresponding fluoro-alkyl silicon resins.

*Example V*

A stream of gaseous trifluoromethyl iodide, $CF_3I$, is passed over a porous silicon-catalyst mass (as used in Example I) in a suitable reaction vessel. A reaction temperature varying between about 300° C. and about 350° C. is maintained within the reaction vessel. Contact of the gas-silicon mass is maintained for a sufficient time effective to produce a reaction product comprising chiefly, trifluoromethyl silicon iodides, viz: trifluoromethyl silicon tri-iodide, di-trifluoromethyl silicon di-iodide and tri-trifluoromethyl silicon iodide. This reaction product is next subjected to hydrolysis with water under conditions effective to produce the corresponding fluoroalkyl silicon resins.

It will be understood, that the compounds thus produced, in accordance with the foregoing examples, may be condensed not only by hydrolysis but also by any conventional method known to those skilled in the art, wherein the corresponding resinous polymers may be effectively obtained.

From the foregoing description, it will be seen that the present invention provides an efficient and economical method for the production of resinous organic polymers, wherein fluorine is incorporated into the alkyl radicals of silicon resins, with the resulting advantages derived in obtaining new compositions of improved resinous organic polymers possessing greater thermal and chemical stability than have heretofore been known.

Having thus described our invention, what we claim and desire to secure by Letters Patent is:

1. As a new composition of matter: a perfluoroalkyl silicon halide having the general formula $$[C_nF_{(2n+1)}]_y SiX_z$$

in which X is a halogen selected from the group consisting of chlorine, bromine and iodine, $n$ is a whole number, and the sum of $y$ and $z$ is equal to 4.

2. As a new composition of matter: di-trifluoromethyl silicon di-chloride, $(CF_3)_2SiCl_2$.

3. As a new composition of matter: di-pentafluoroethyl silicon di-chloride, $(C_2F_5)_2SiCl_2$.

4. As a new composition of matter: di-heptafluoropropyl silicon di-chloride, $(C_3F_7)_2SiCl_2$.

5. As a new composition of matter: di-trifluoromethyl silicon di-bromide, $(CF_3)_2SiBr_2$.

6. As a new composition of matter: di-trifluoromethyl silicon di-iodide, $(CF_3)_2SiI_2$.

References Cited in the file of this patent

UNITED STATES PATENTS

| Number | Name | Date |
|---|---|---|
| 2,380,995 | Rochow | Aug. 7, 1945 |
| 2,478,493 | Levine | Aug. 9, 1949 |
| 2,651,651 | Simons | Sept. 8, 1953 |